(12) United States Patent
Dahlheimer

(10) Patent No.: US 7,108,266 B2
(45) Date of Patent: Sep. 19, 2006

(54) FAN COOLED SEAL SEAT

(75) Inventor: John C. Dahlheimer, Laconia, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 130 days.

(21) Appl. No.: 10/435,957

(22) Filed: May 12, 2003

(65) Prior Publication Data

US 2003/0214099 A1 Nov. 20, 2003

Related U.S. Application Data

(60) Provisional application No. 60/381,968, filed on May 20, 2002.

(51) Int. Cl.
*F16J 15/40* (2006.01)
*F01D 11/02* (2006.01)
*F01D 11/00* (2006.01)
*F04B 17/00* (2006.01)

(52) U.S. Cl. .................. 277/409; 277/423; 415/113; 415/174.3; 417/423.11

(58) Field of Classification Search ................ 277/409, 277/411, 412, 423, 424; 417/423.11; 415/171.1, 415/174.3, 168.2, 168.3, 111, 113
See application file for complete search history.

(56) References Cited

U.S. PATENT DOCUMENTS

| | | | | |
|---|---|---|---|---|
| 3,088,416 | A | * | 5/1963 | Danis .......................... 415/132 |
| 4,129,402 | A | * | 12/1978 | Eberhardt .................. 415/56.1 |
| 4,172,310 | A | * | 10/1979 | Mincuzzi ............... 29/888.024 |
| 4,224,899 | A | * | 9/1980 | Cruchelow et al. ......... 119/501 |
| 4,746,269 | A | * | 5/1988 | Raab ....................... 415/170.1 |
| 5,123,660 | A | * | 6/1992 | Dahlheimer et al. ........ 277/393 |
| 5,624,245 | A | * | 4/1997 | DeClerck et al. ........... 417/373 |
| 5,636,848 | A | * | 6/1997 | Hager et al. ................. 277/420 |
| 5,718,436 | A | * | 2/1998 | Dunford ..................... 277/423 |
| 5,911,565 | A | * | 6/1999 | Mann et al. ................. 417/373 |

* cited by examiner

*Primary Examiner*—Vishal Patel
(74) *Attorney, Agent, or Firm*—Ronald W. Wangerow; Harness, Dickey & Pierce, P.L.C.

(57) ABSTRACT

A seal assembly including a rotatable seal head subassembly also includes a fan that rotates with the seal head assembly, with the fan drawing air through a pump housing for purposes of cooling.

7 Claims, 6 Drawing Sheets

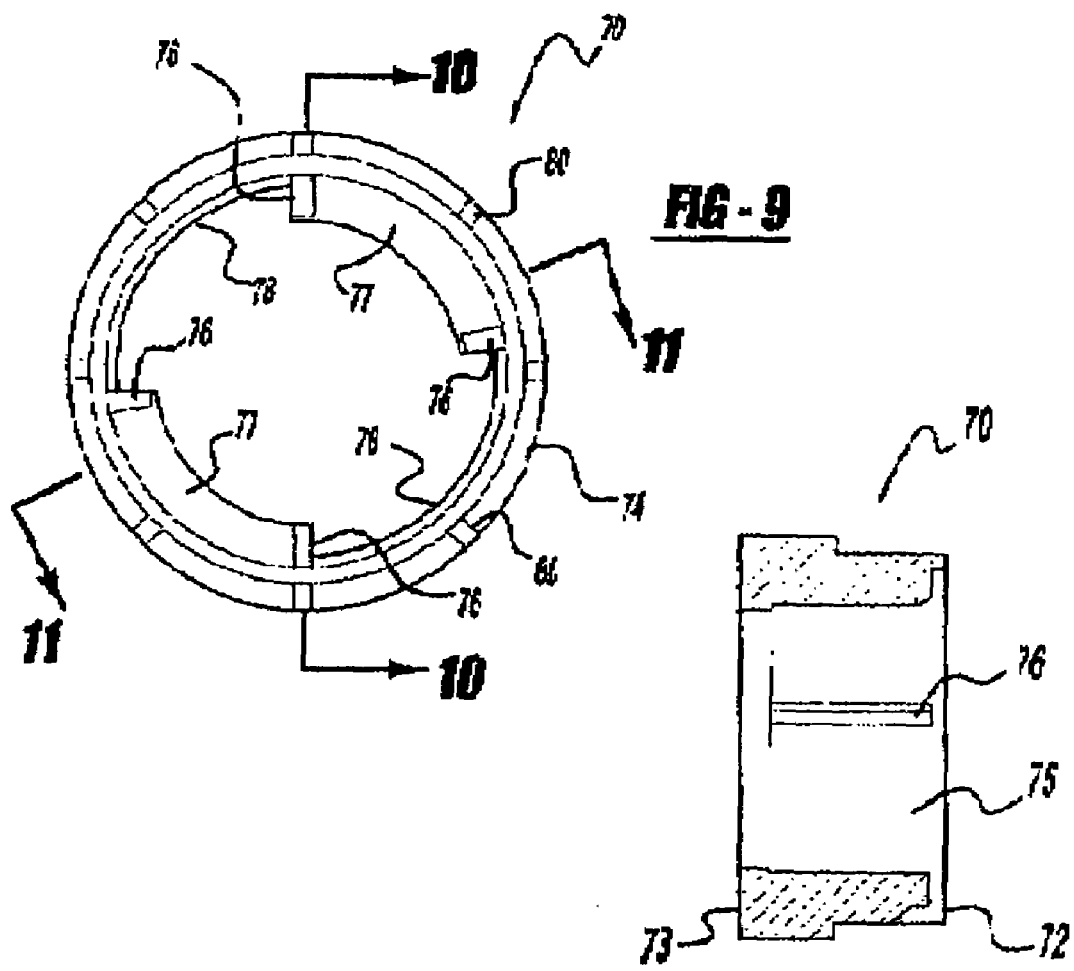
FIG-9
FIG-10
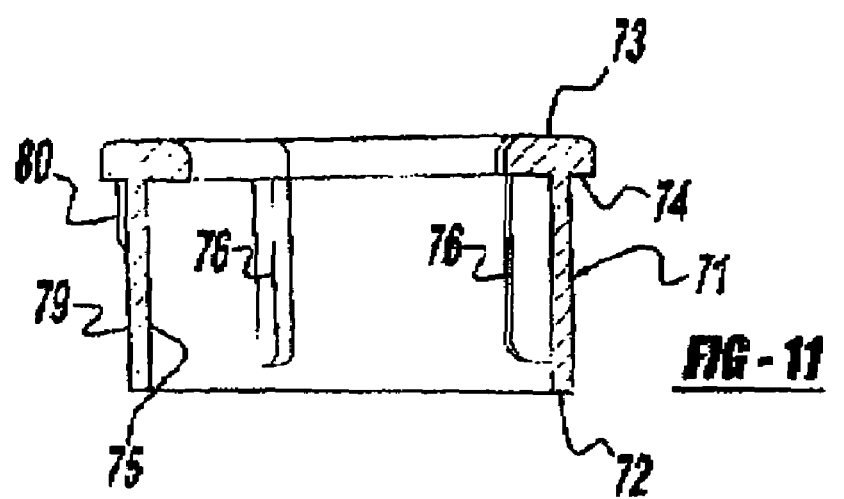
FIG-11

FAN COOLED SEAL SEAT

CROSS-REFERENCE TO RELATED APPLICATIONS

This application claims priority from U.S. Provisional Application No. 60/381,968, filed May 20, 2002.

BACKGROUND OF THE INVENTION

This invention relates in general to seals for rotating shafts. In particular, this invention relates to a shaft seal having a fan cooled seal seat.

An automatic dishwasher includes a pump for discharging wash water from an interior of the appliance. The pump includes a motor having a rotatable shaft that is connected to a pump impeller. A mechanical face seal is used to provide a seal about the rotatable shaft at the point where it extends from a pump housing. The pump housing, face seal, and motor are subject to heat due to friction. Extended exposure to heat can cause failures of the housing, face seal, and/or motor.

BRIEF DESCRIPTION OF THE DRAWINGS

FIG. 9 is a bottom end view of the impeller of FIGS. 1–3 removed from the remainder of the seal assembly.

FIG. 10 is a sectional view taken along line 10—10 of FIG. 9.

FIG. 11 is a sectional view taken along line 11—11 of FIG. 9 that has been rotated.

DETAILED DESCRIPTION OF THE INVENTION

Figure 1:
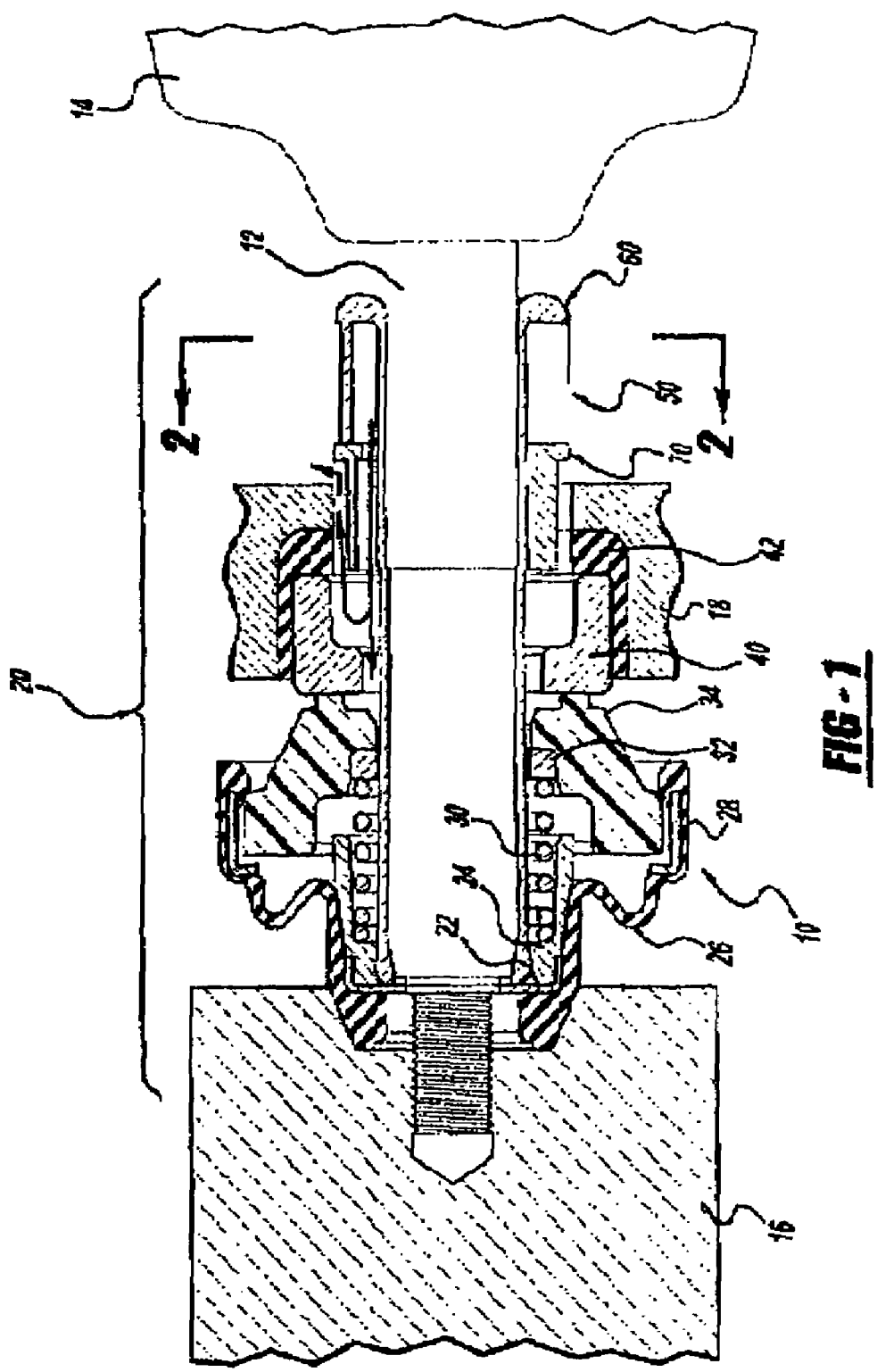
FIG. 1 is a sectional view of a mechanical face seal assembly having a compressor and an impeller according to this invention, wherein the seal assembly is illustrated mounted on a shaft of a dishwasher pump.

A mechanical face seal assembly is indicated generally at 10 in FIG. 1. The seal assembly 10 is shown mounted on a rotatable shaft 12 of a pump motor 14. A terminating end of the shaft 12 is secured to a pump impeller 16, which is mounted inside a pump housing 18. One application of the seal assembly 10, shaft 12, pump motor 14, pump impeller 16, and pump housing 18 is a dishwasher.

The seal assembly 10 includes a seal head subassembly 20 that is mounted on and rotates with the shaft 12. The seal head subassembly 20 includes a case 22 and a spring seat 24 that are received within a cavity of a boot 26. An annular insert 28 is provided at a terminating end of the boot 26. One end of a spring 30 is placed against the spring seat 24. An opposite end of the spring 30 is placed against a washer 32 that fits in an annular groove of a seal washer 34.

The seal washer 34 engages a stationary seal seat 40. The spring 30 provides a force to maintain the engagement of the seal washer 34 with the seal seat 40. The seal seat 40 is placed against a grommet 42 that is placed against the pump housing 18.

Figure 3:
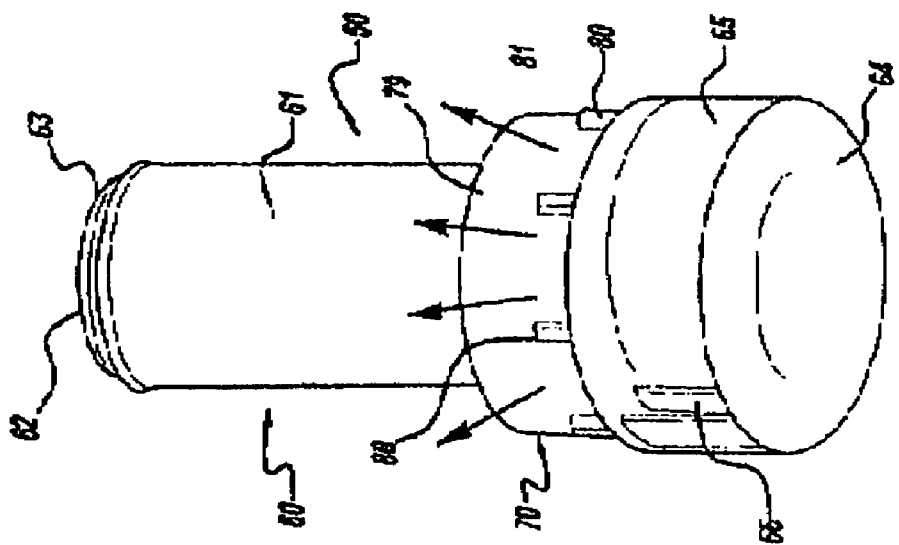
FIG. 3 is a perspective view of the assembled compressor and impeller of FIG. 1 removed from the remainder of the seal assembly for clarity of illustration.
Figure 2:
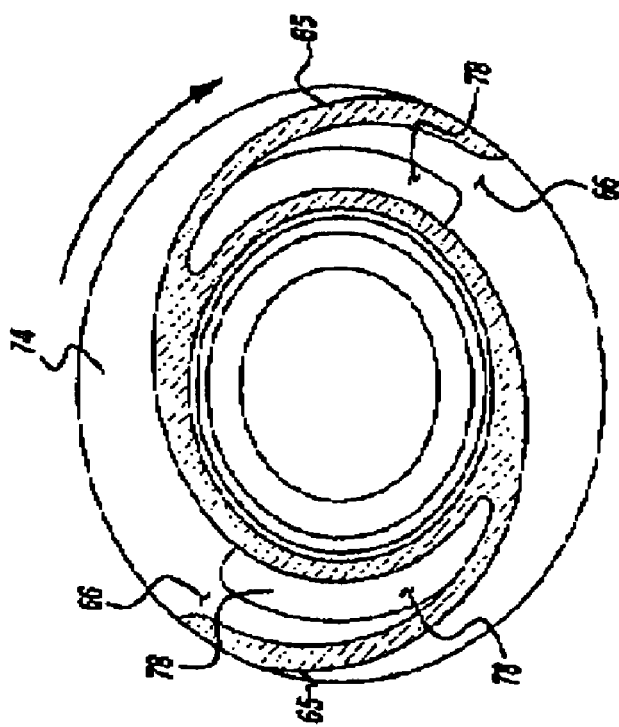
FIG. 2 is a sectional view taken along line 2—2 of FIG. 1.
Figure 4:
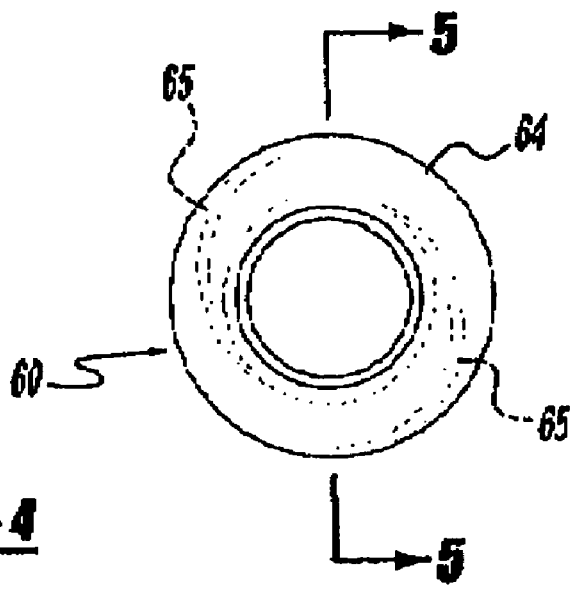
FIG. 4 is an end view of the compressor illustrated in FIGS. 1—3 removed from the remainder of the seal assembly.
Figure 5:
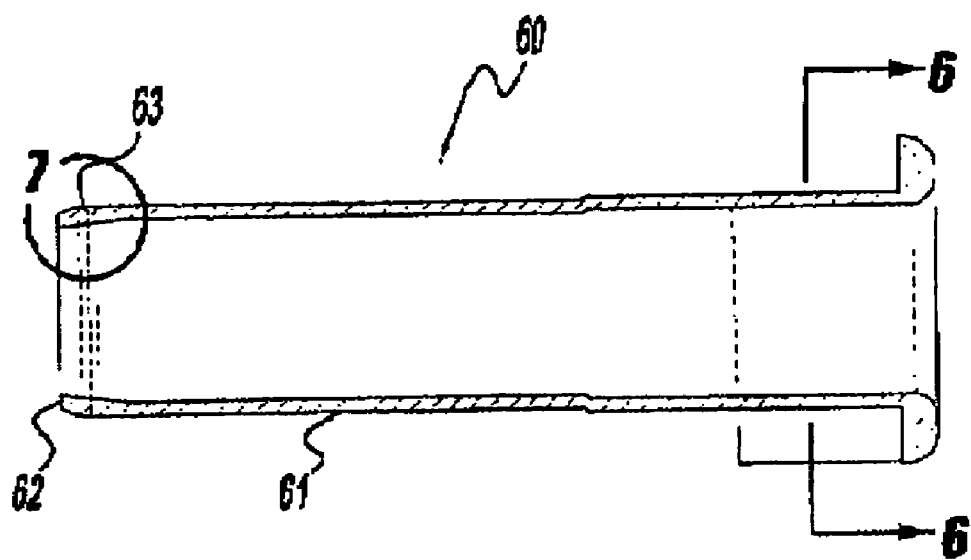
FIG. 5 is a sectional view taken along line 5—5 of FIG. 4.
Figure 6:
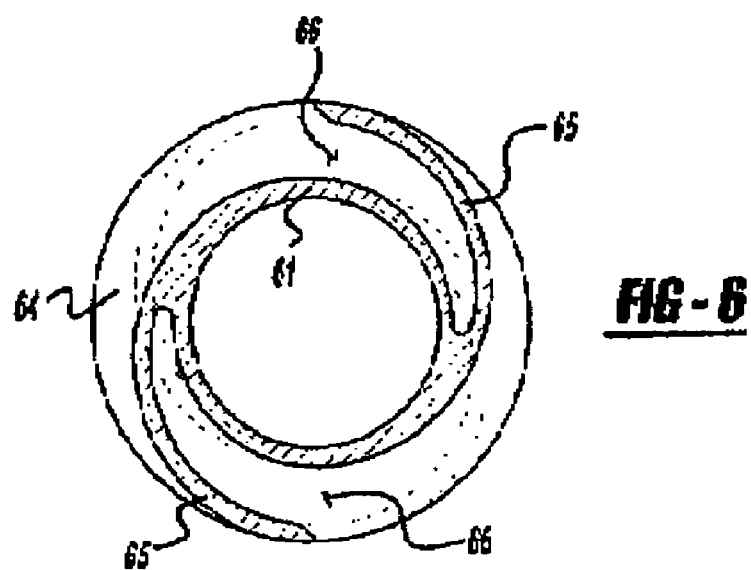
FIG. 6 is a sectional view taken along line 6—6 of FIG. 5.
Figure 7:
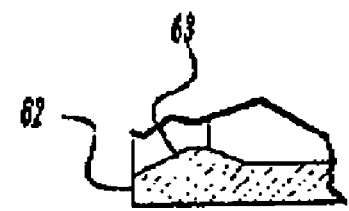
FIG. 7 is an enlarged view of a portion of the compressor found in circle 7 of FIG. 5.
Figure 8:
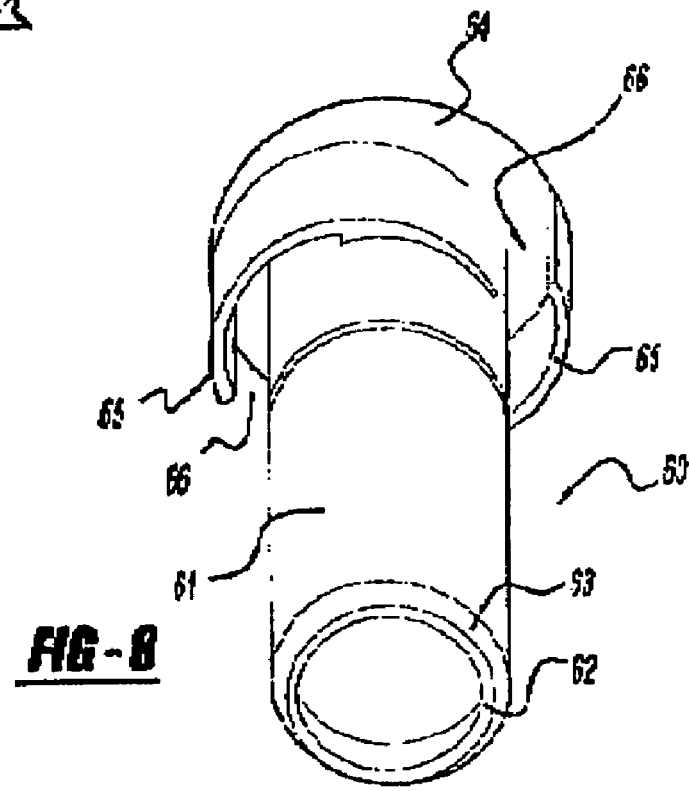
FIG. 8 is a perspective view of the compressor of FIGS. 4–6.
Figure 12:
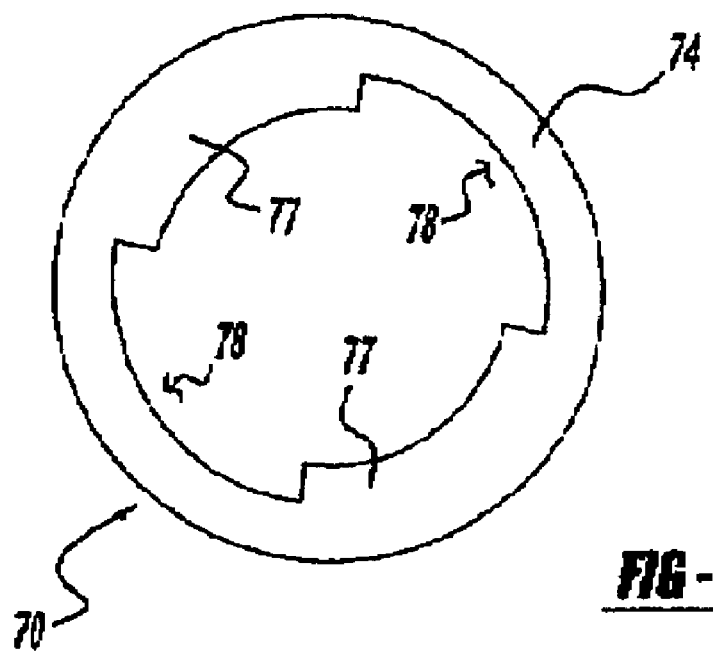
FIG. 12 is a top end view of the impeller of FIGS. 9–11.
Figure 13:
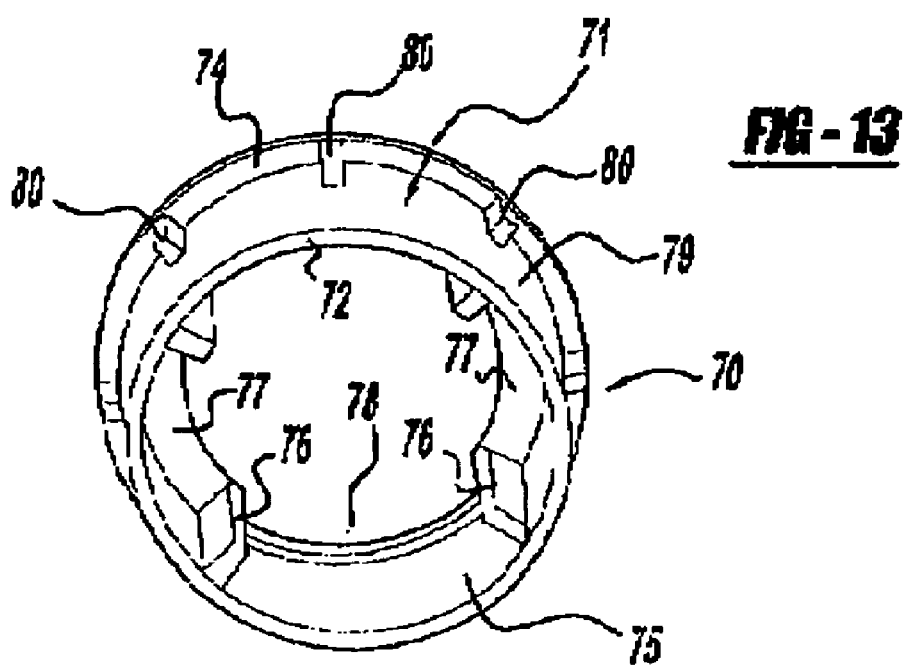
FIG. 13 is a perspective view of the impeller of FIGS. 9–12.

The seal assembly 10 also includes a fan subassembly 50, illustrated separately in FIG. 3. As the fan subassembly 50 rotates with the shaft 12 and seal head subassembly 20, air is drawn from outside the pump housing 18, flows past the seal washer 34 and the seal seat 40, and is expelled through an outlet in the pump housing 18. Arrows in FIG. 1 indicate the flow of air. This circulating air provides a cooling effect to the seal seat 40, seal washer 34, and the pump housing 18. This cooling effect can extend the effective life of the seal assembly 10 and the associated pump.

The fan subassembly 50 includes a compressor 60, illustrated separately in FIGS. 4–8, and an impeller 70, illustrated separately in FIGS. 9–13. The compressor 60 includes a longitudinal tube portion 61 having a first end 62 that fits into the spring seat 24. An outer profile 63 (see FIG. 7) is formed on an outer wall of the first end 62 that is complementary to an annular groove formed in the spring seat 24. A second end 64 of the compressor 60 includes a plurality of vanes 65. Preferably, the vanes 65 are formed as spiral segments that can capture air and force it toward the first end 62. Intake openings 66 are provided at an originating point of each vane 65 into which air is drawn. The tube portion 61 is slip fitted onto the shaft 12 so that the compressor 60 rotates with the shaft 12.

The impeller 70 includes a collar portion 71 having a first end 72 and a second end 73. A rim 74 can be formed at the second end 73. Along an inner circumferential wall 75 of the collar portion 71, a plurality of axial vanes 76 is provided. In the embodiment of FIGS. 9–13, four vanes 76 are divided into two pairs. Each pair of vanes 76 includes a bridge 77 that is provided at the intake side of each vane 76. As seen best in FIG. 9, arcuate openings 78 are provided between each bridge 77. The bridges 77, openings 78, and vanes 76 enhance the flow of air along the tube portion 61 of the compressor 60. Along an outer circumferential wall 79 of the collar portion 71, a plurality of axial vanes 80 are provide that enhance the exit of air from inside the pump housing 18. Exit channels or air outlets 81 are formed between the vanes 80.

As illustrated in FIG. 1, the rim 74 of the impeller 70 is placed at an exterior point of the pump housing 18. The intake openings 66 of the compressor 60 are provided beyond the rim 74 away from the pump housing 18. In this manner, the intake openings 66 and air outlets 81 permit air from outside the pump housing 18 to cool an interior portion of the pump housing 18.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A pump having a seal assembly, comprising:
a motor disposed at one end of a shaft and an impeller disposed at a second end of the shaft within a pump housing;
the seal assembly including:
a rotatable seal head subassembly including an annular seal seat surrounding the shaft and a seal washer axially biased against said seal seat and rotatable with said shaft;
a spring seat surrounding the shaft;
a spring disposed between said spring seat and said seal washer; and
a fan mounted to the shaft and disposed between the impeller and motor, said fan rotates with the seal head subassembly, wherein the fan draws air from an exterior of the pump housing into the pump housing toward the seal seat and expels the air from the pump housing. wherein said fan is a subassembly having a compressor including a longitudinal tube portion having a first end engaging said spring seat.

2. The pump specified in claim 1 wherein said longitudinal tube portion has a second end including a plurality of vanes.

3. The pump specified in claim 2 further comprising an impeller mounted to said longitudinal tube portion.

4. The pump specified in claim 3 wherein said impeller includes a plurality of interior vanes and a plurality of exterior vanes.

5. A seal assembly for sealing around a rotatable shaft, comprising:
an annular seal seat surrounding the shaft;
a seal washer axially biased against said seal seat and rotatable with said shaft;
a cooling fan system rotatable with said shaft and configured for directing cooling air toward said annular seal seat; and
a spring seat surrounding the shaft and a spring disposed between said spring seat and said seal washer, wherein said fan is a subassembly having a compressor including a longitudinal tube portion having a first end engaging said spring seat; wherein said longitudinal tube portion has a second end including a plurality of vanes.

6. The seal assembly according to claim 5 further comprising an impeller mounted to said longitudinal tube portion.

7. The seal assembly specified in claim 6 wherein said impeller includes a plurality of interior vanes and a plurality of exterior vanes.

* * * * *